United States Patent
Blaurock et al.

(10) Patent No.: US 6,364,086 B1
(45) Date of Patent: Apr. 2, 2002

(54) CHAIN OF ROLLING ELEMENTS CHAIN ARRANGEMENT

(75) Inventors: Günter Blaurock, Niederwerrn (DE); Viktor Pfeuffer, Auburn Hills, MI (US); Rudolf Schlereth, Franenroth; Hans-Georg Stender, Hambach, both of (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 09/449,227

(22) Filed: Nov. 24, 1999

Related U.S. Application Data

(63) Continuation-in-part of application No. 09/317,418, filed on May 24, 1999, now abandoned.

(30) Foreign Application Priority Data

May 29, 1998 (DE) .......................................... 198 24 250

(51) Int. Cl.[7] .............................................. B65G 13/00
(52) U.S. Cl. .................................... 193/35 MD; 193/37
(58) Field of Search ................................ 198/835, 837, 198/35; 193/35 MD, 37; 384/43, 48, 51, 44, 45, 533

(56) References Cited

U.S. PATENT DOCUMENTS

| | | |
|---|---|---|
| 1,241,669 A | 10/1917 | Schneider |
| 2,557,476 A | 6/1951 | Schwitter |
| 2,566,421 A | 9/1951 | Lapointe |
| 2,897,021 A | 7/1959 | Zeilman ..................... 308/199 |
| 2,987,350 A | 6/1961 | Hay |
| 3,292,981 A | 12/1966 | Zaugg |
| 3,486,212 A | 12/1969 | Vannest |
| 3,682,284 A | * 8/1972 | Sakamoto ............. 143/35 MD |
| 3,733,110 A | 5/1973 | Davis ......................... 308/217 |
| 4,243,131 A | * 1/1981 | Young .................. 193/35 MD |
| 4,946,294 A | * 8/1990 | Yamada ............. 193/35 MD X |
| 5,156,462 A | 10/1992 | Jacob et al. |
| 5,295,749 A | 3/1994 | Takahashi et al. .......... 384/568 |
| 5,927,858 A | 7/1999 | Agari .......................... 384/45 |
| 6,049,988 A | 4/2000 | Shirai .............................. 33/1 |

FOREIGN PATENT DOCUMENTS

| | | |
|---|---|---|
| DE | 909236 | 4/1951 |
| DE | 835718 | 5/1951 |

(List continued on next page.)

Primary Examiner—James R. Bidwell
(74) Attorney, Agent, or Firm—Baker Botts L.L.P.

(57) ABSTRACT

A chain of rolling elements comprises a plurality of rolling elements and an elongate carrier belt with a plurality of recesses for receiving the rolling elements, a plurality of retainers for retaining the rolling elements received in the recesses and at least one elongate flexible element for connecting the retainers. The carrier belt comprises two lateral edge portions and a central portion connecting them, the retainers being connected to the at least one flexible element in the lateral edge regions of the carrier belt. Separate retainers are associated with successive rolling elements, at least one retainer associated with each rolling element being provided on the at least one flexible element in the longitudinal direction thereof before and after each rolling element.

37 Claims, 10 Drawing Sheets

FOREIGN PATENT DOCUMENTS

| | | |
|---|---|---|
| DE | 1575484 | 1/1970 |
| DE | 2123529 | 12/1972 |
| DE | 7510136 | 7/1975 |
| DE | 2602265 | 7/1976 |
| DE | 2160707 | 8/1977 |
| DE | 2618535 | 11/1977 |
| DE | 2735152 | 2/1979 |
| DE | 2911614 | 10/1979 |
| DE | 2906128 | 8/1980 |
| DE | 3023978 | 1/1982 |
| DE | 3341778 | 5/1984 |
| DE | 3324840 | 10/1984 |
| DE | 3348358 | 10/1984 |
| DE | 3434197 | 3/1986 |
| DE | 3526626 | 1/1987 |
| DE | 3635261 | 7/1987 |
| DE | 3621770 | 1/1988 |
| DE | 3626174 | 2/1988 |
| DE | 3635725 | 4/1988 |
| DE | 36364922 | 4/1988 |
| DE | 37 09 039 A1 | 10/1988 |
| DE | 3709039 | 10/1988 |
| DE | 37 09 039 | 10/1988 |
| DE | 3722651 | 1/1989 |
| DE | 3812377 | 6/1989 |
| DE | 3824191 | 1/1990 |
| DE | 8914085 | 2/1990 |
| DE | 287 313 | 2/1991 |
| DE | 4025011 | 2/1992 |
| DE | 4103672 | 8/1992 |
| DE | 4210060 | 10/1992 |
| DE | 4211400 | 10/1993 |
| DE | 42 29 136 | 3/1994 |
| DE | 19830578 | 2/1999 |
| EP | 0076754 | 4/1983 |
| EP | 0159487 | 10/1985 |
| EP | 0351499 | 1/1990 |
| EP | 0743465 | 11/1996 |
| JP | 47-29137 | 4/1972 |
| JP | 47-29037 | 12/1972 |
| JP | 5119147 | 7/1974 |
| JP | 5637718 | 8/1979 |
| JP | 56148119 | 4/1980 |
| JP | 61150524 | 9/1986 |
| JP | 620111709 | 5/1987 |
| JP | 62-242126 | 10/1987 |
| JP | 64-12129 | 1/1989 |
| JP | 5-52215 | 3/1993 |
| JP | 5-52217 | 3/1993 |
| JP | 5-126149 | 5/1993 |
| JP | 5060131 | 6/1993 |
| JP | 5-196036 | 8/1993 |
| JP | 05196037 | 8/1993 |
| JP | 5-196037 | 8/1993 |
| JP | 08338430 | 12/1996 |
| JP | 10089358 | 4/1998 |
| JP | 11-22727 | 1/1999 |
| WO | WO 87/04502 | 7/1987 |
| WO | WO95/32366 | 11/1995 |

* cited by examiner

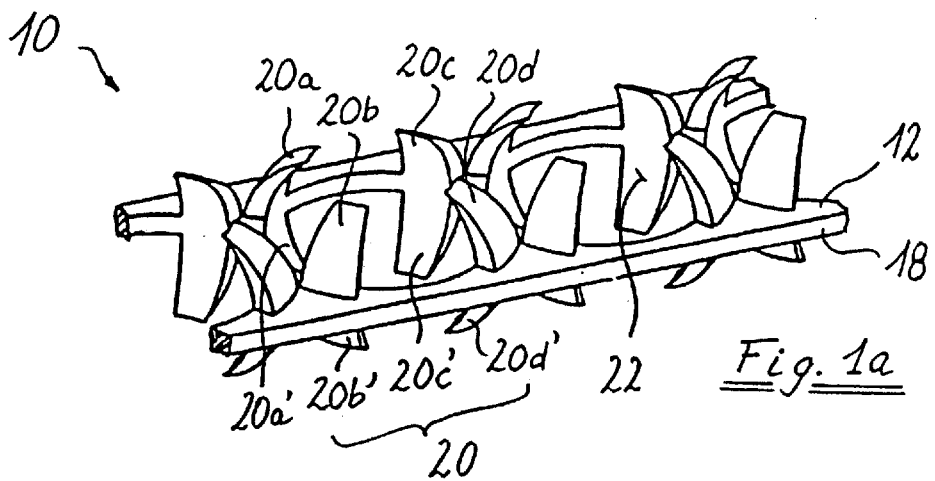
Fig. 1a
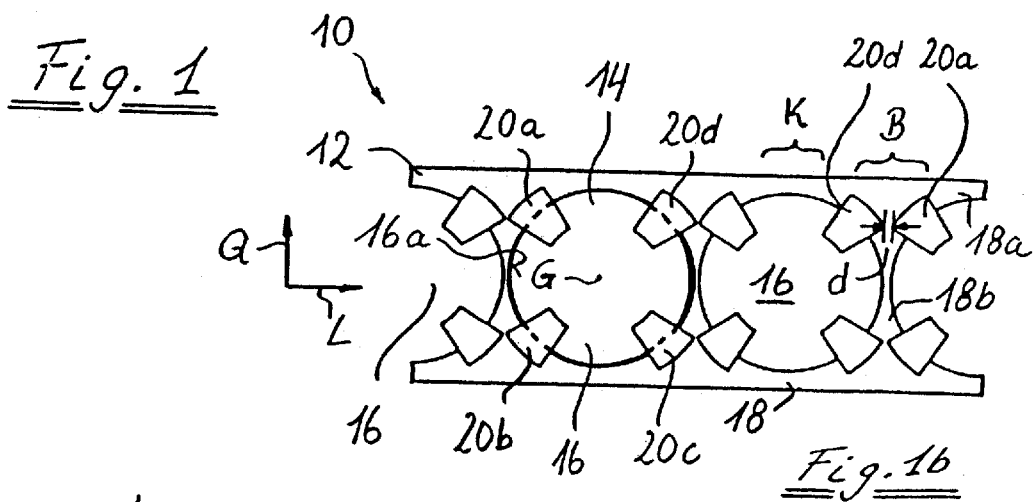
Fig. 1b
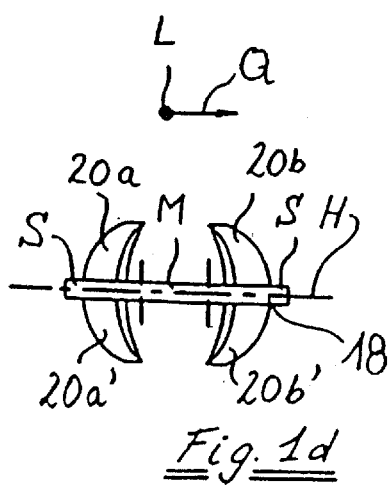
Fig. 1d
Fig. 1c

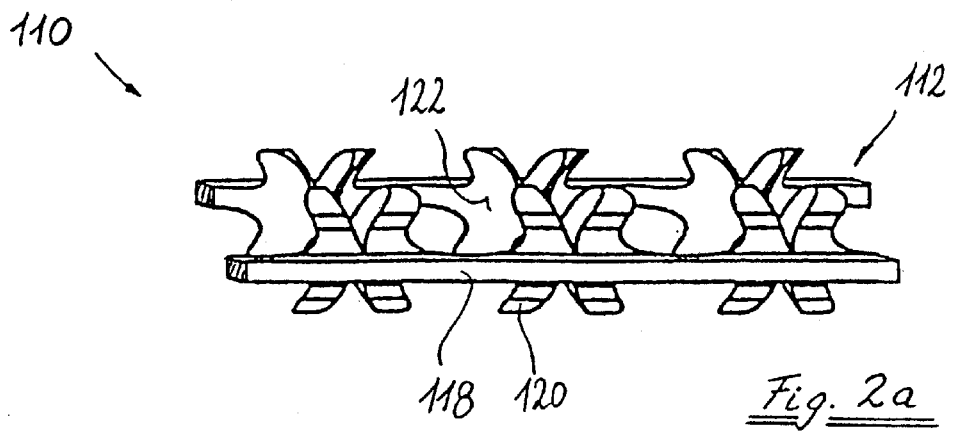
Fig. 2a
Fig. 2
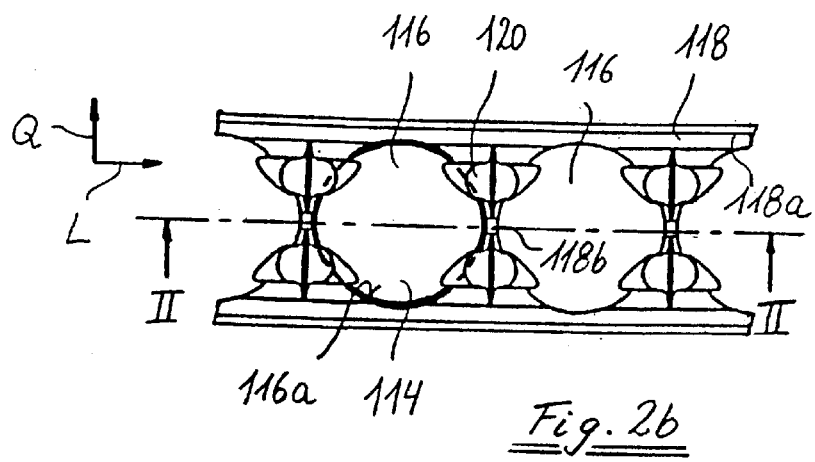
Fig. 2b
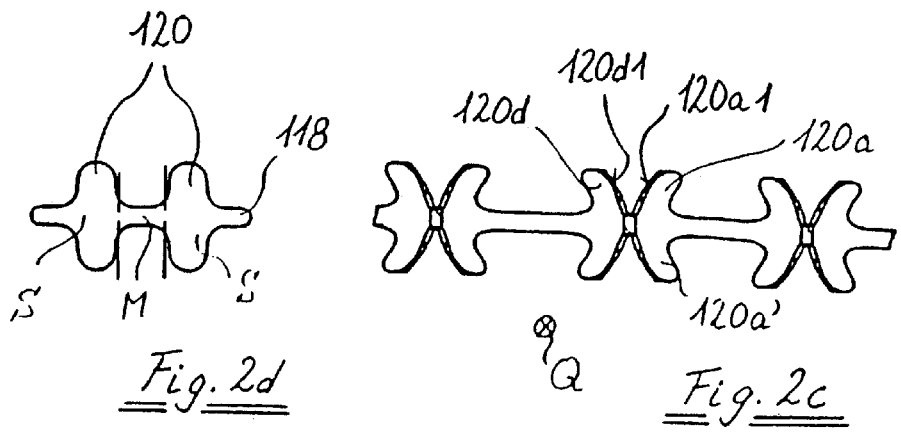
Fig. 2d
Fig. 2c

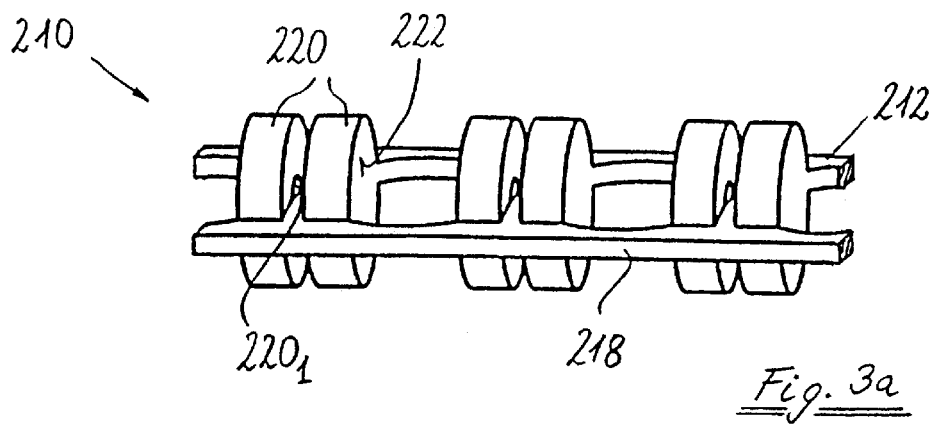
Fig. 3
Fig. 3a
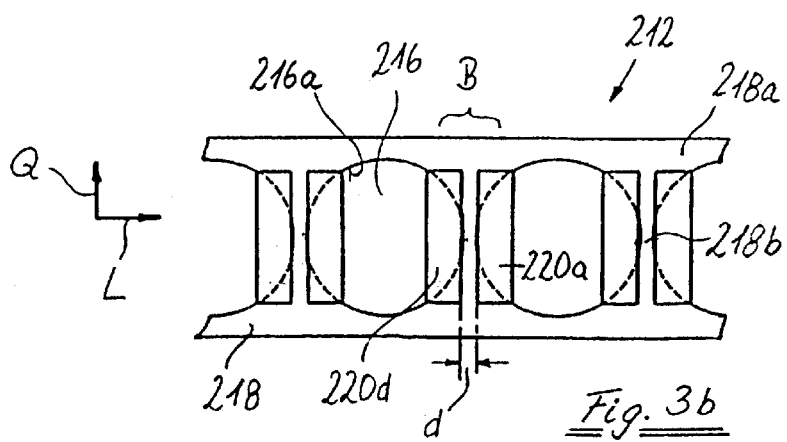
Fig. 3b
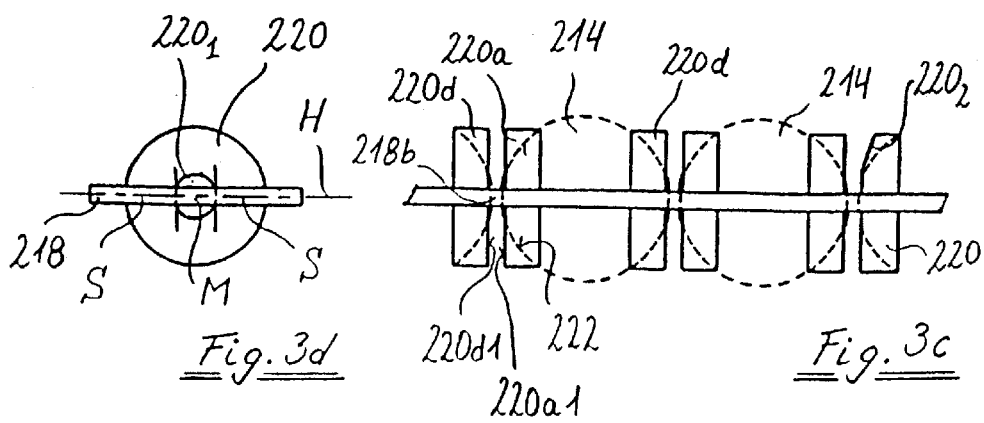
Fig. 3d
Fig. 3c

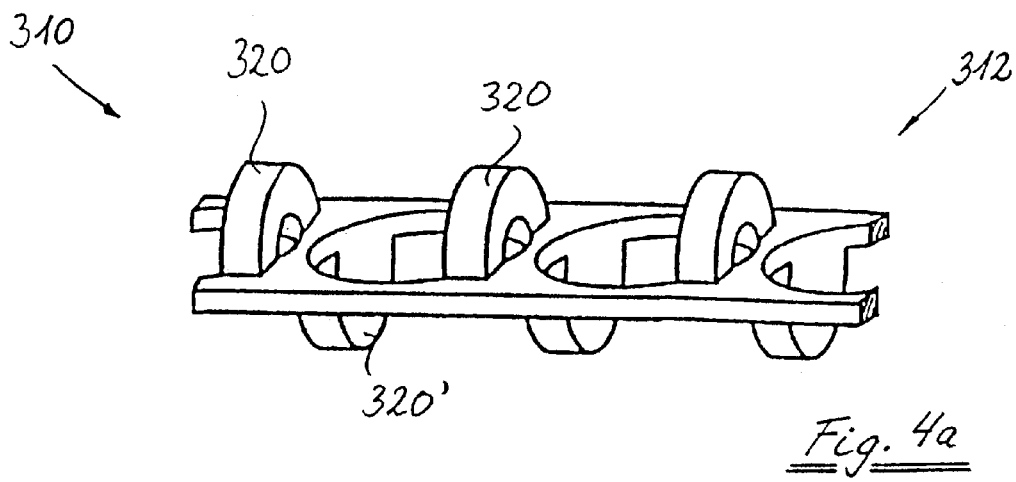
Fig. 4a
Fig. 4
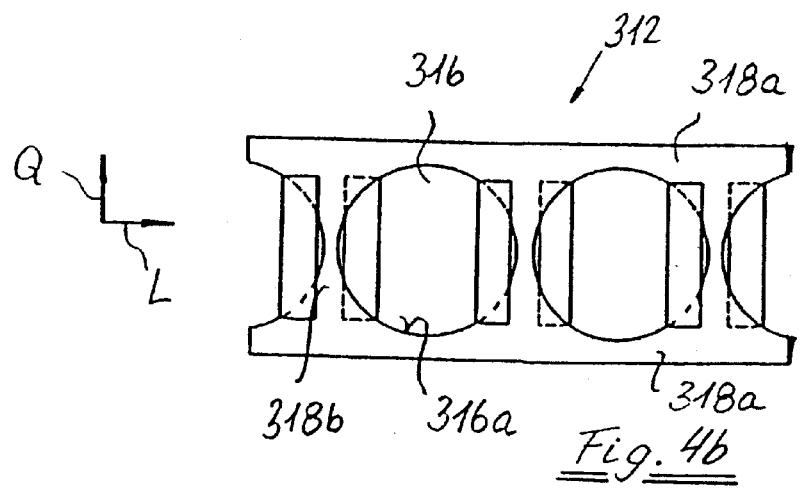
Fig. 4b
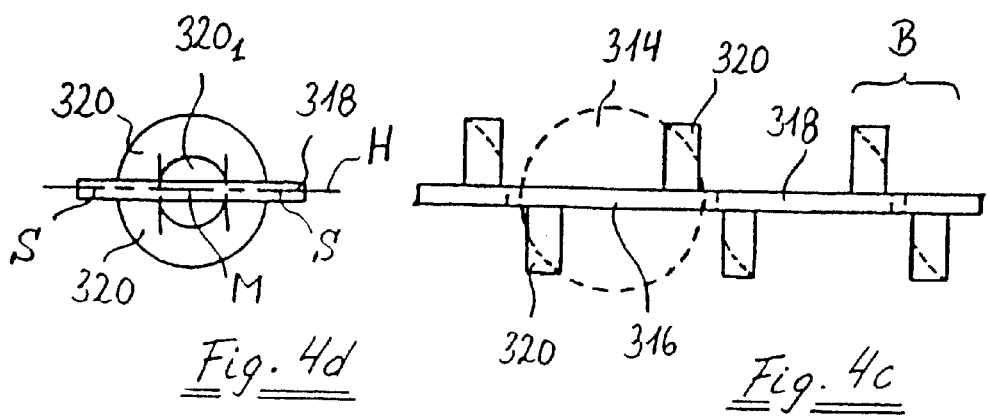
Fig. 4d
Fig. 4c

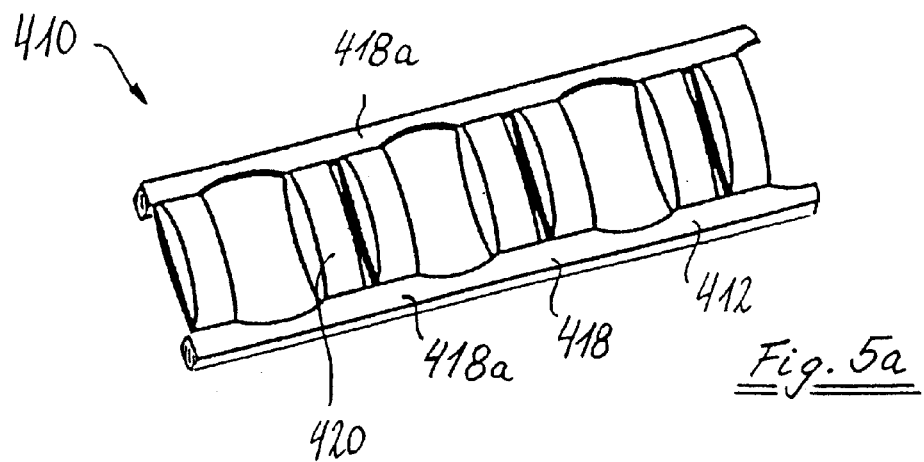
Fig. 5
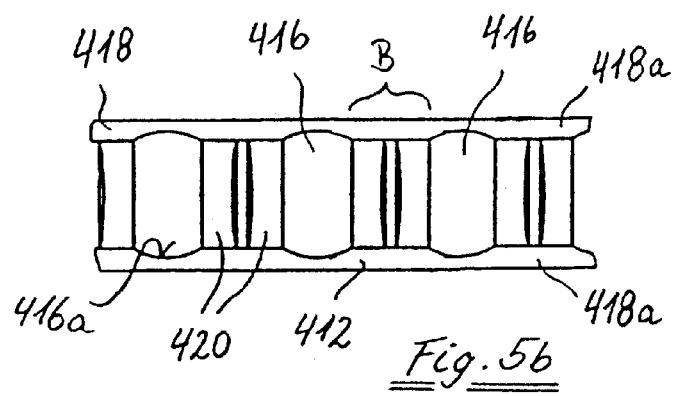
Fig. 5b
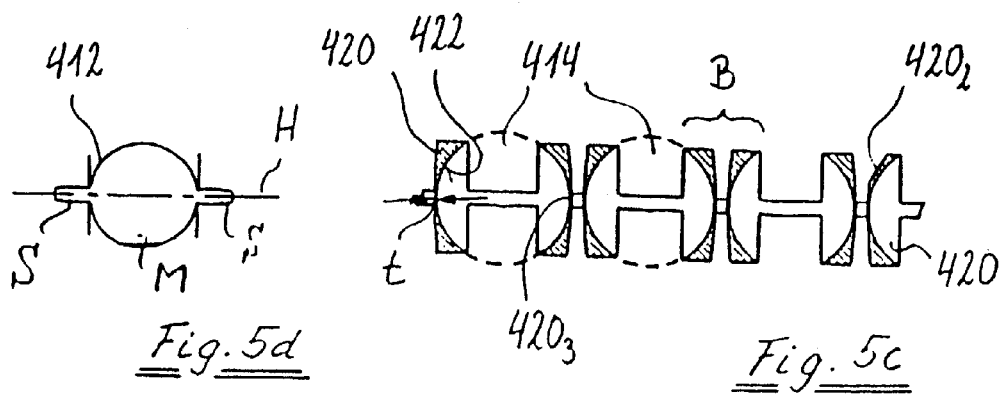
Fig. 5d
Fig. 5c

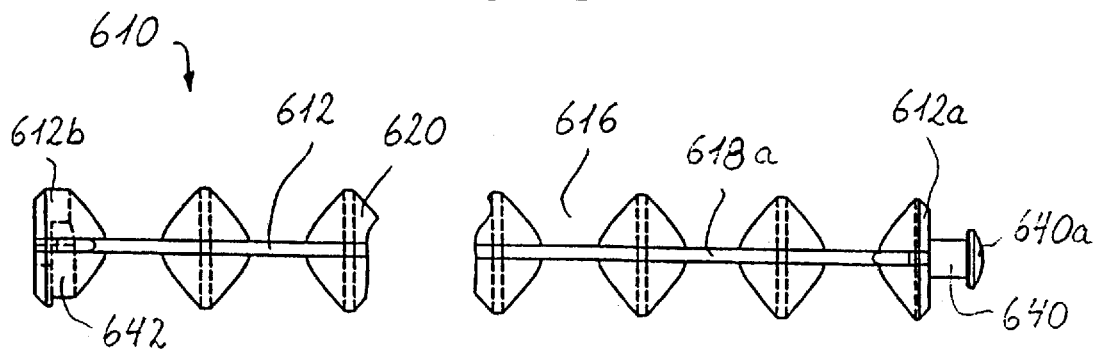
Fig. 7
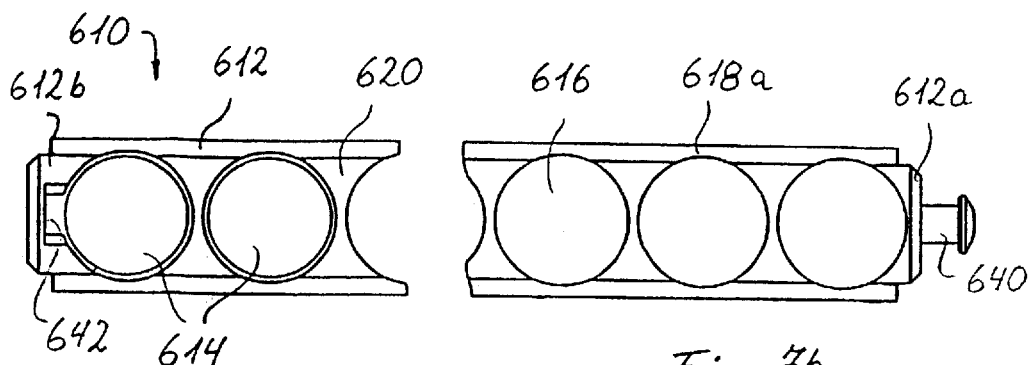
Fig. 7a
Fig. 7b
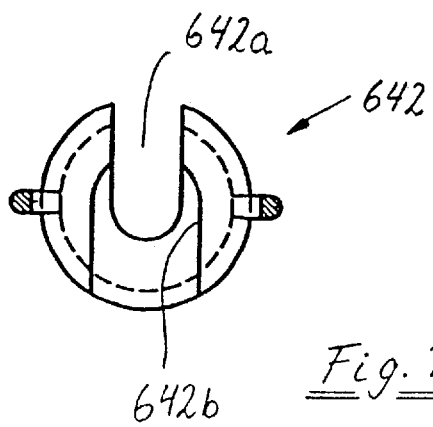
Fig. 7c

CHAIN OF ROLLING ELEMENTS CHAIN ARRANGEMENT

CROSS-REFERENCE TO PRIOR APPLICATION

The present application is a continuation-in-part of Application No. 09/317,418, filed May 24, 1999, now abandoned.

1. Field of the Invention

The invention relates to a chain of rolling elements comprising a plurality of rolling elements and an elongate carrier belt, wherein the carrier belt comprises a plurality of recesses for receiving the rolling elements, a plurality of retainers for retaining the rolling elements received in the recesses and at least one elongate flexible element for connecting the retainers and wherein two lateral edge portions and a central portion connecting them can also be distinguished on the carrier belt, the retainers being connected to the at least one flexible element in the lateral edge region of the carrier belt.

2. Background of the Invention

A chain of rolling elements of this type is known, for example, from Japanese patent laid-open print 5-52217 (1993) to Japanese patent application 3-235563 (1991). The known chain of rolling elements comprises a plurality of balls arranged in recesses in a carrier belt. Between each two successive balls there is arranged a retainer which comprises, on its sides leading or trailing in the longitudinal direction of the carrier belt, a respective retaining face for sliding engagement with the leading or trailing ball. The retainers are connected to one another by two flexible strip elements and form the carrier belt together with it.

The known ball chain has the advantage that the balls can be arranged in close succession, i.e. with minimal spacing from one another. The ratio of the ball diameter to the spacing between the centres of two adjacent balls is approximately 1:1. Owing to the resultant high ball density, the known ball chain has a high load-carrying or load-bearing capacity. However, the stiffening of the carrier belt accompanying the fastening of the two strip elements to the retainers in the region between two successive balls is disadvantageous. The strip elements of the carrier belt are able to react to bending of the carrier belt round an axis extending parallel to the transverse direction of the carrier belt, for example in the deflection portions of the race of a linear bearing, only in the region of their lateral contact with the balls but not in the region of their lateral fastening to the retainers.

The resultant relatively pronounced bending of the carrier belt in the region of its lateral contact with the balls leads to a corresponding restoring force of the carrier belt, resulting from the elasticity of the carrier belt material, into its rectilinear position. This restoring force influences the movement of the balls in the deflection portions of the race owing to the retaining of the balls by the carrier belt. In a linear bearing equipped with the known chain of rolling elements, the pronounced bending of the carrier belt can lead to more pronounced generation of noise and to increased friction between the strip elements and the guide grooves.

Further chains of balls with balls in close succession are disclosed, for example, in U.S. Pat. Nos. 2,897,021 and 3,292,981. In these ball chains also a retainer is arranged in each case between two successive balls, the retainer comprising a retaining face for sliding engagement with the leading ball as well as a retaining face for sliding engagement with the trailing ball.

A further non-generic chain of rolling elements is known from Japanese patent laid-open print 62-242126 (1987) to Japanese patent application 60-253865 (1985). In the chains of rolling elements known from FIGS. 5 and 6 thereof, each rolling element is retained by two retainers associated with it and only with it. Therefore, between two successive rolling elements there are provided two physically separated retainers which are arranged in a central portion of the carrier belt with predetermined spacing from one another.

The carrier belt of the known chain of rolling elements has the advantage that it can be bent round an axis extending parallel to the transverse direction not only in the regions of its lateral contact with the rolling elements but also in the regions between two successive rolling elements. As the number of bending points is twice that in JP-A-5-52217 (1993), the carrier belt is bent less at each individual bending point with equal curvature of a deflection portion of the race and influences the running of the rolling elements to a correspondingly smaller extent and this results in smoother running of a linear bearing equipped with the known chain of rolling elements. The chain of rolling elements known from JP-A-62-242126 (1987) has the drawback, however, that the rolling elements are arranged in a loose succession, i.e. with relatively great mutual spacing, to provide the space required for the separate retainers. The ratio of the ball diameter to the spacing of the centres of two adjacent balls is approximately 1:1.5. The resultant lower density of rolling elements is accompanied by a corresponding reduction in the load-carrying capacity of the chain of rolling elements.

DE-PS 835 718 discloses a chain of rolling elements in which the spacing between successive rolling elements is about twice the diameter of the rolling elements. The rolling elements are retained by tongues arranged therebetween of a spring steel strip carrying them. A chain of rolling elements with rolling element spacing of similar size, i.e. similarly loose succession of rolling elements, is disclosed in U.S. Pat. No. 2,557,476.

DE 36 35 261 A1 describes a ball chain with average ball spacing. In other words, the ratio of the ball diameter to the spacing of the centres of successive balls is about 1:1.25. Each of the balls is associated with mutually separated retainers arranged between the balls. Therefore, the retainers are very small and can barely retain the balls.

The ball chain known from DE 29 06 128 A1 is formed from a plurality of chain units which are formed independently of one another and each serve to guide only one of the balls. This arrangement therefore results in a loose succession of balls. The orifices receiving the balls do not retain the balls. Therefore, the chain units also comprise guide blocks which are separate from the receiving orifices and centre the chain units in the ball channel and, in particular its deflection portions with respect to the running of the balls.

Reference is also made to DE 37 09 039 C2, DE 89 14 085 U and U.S. Pat. No. 2,566,421.

SUMMARY OF THE INVENTION

Accordingly, it is an object of the present invention to provide a chain of rolling elements which is distinguished by a high load-carrying or load-bearing capacity and also by smooth running.

According to a first aspect of the invention, this object is achieved by a chain of rolling elements comprising a plurality of rolling elements arranged in close succession and an elongate carrier belt with a plurality of recesses for receiving the rolling elements, a plurality of retainers for retaining the rolling elements received in the recesses, and at least one elongate flexible element for connecting the retainers, wherein the carrier belt can be split into two lateral edge portions and a central portion connecting them, wherein, moreover, the retainers are connected to the at least one flexible element in the lateral edge regions of the carrier belt, wherein, moreover, separate retainers are associated with successive rolling elements, and wherein at least one retainer associated with each rolling element is provided before and after each rolling element on the at least one flexible element in the longitudinal direction thereof. The term close succession of rolling elements is interpreted according to the foregoing discussion of the state of the art as a succession in which the ratio of the diameter of the rolling elements to the spacing of the centres of successive rolling elements is less than 1:1.5, preferably less than 1:1.25, most preferably approximately 1:1.

This solution principle is based on the combined effect of two groups of features. On the one hand, the carrier belt is flexibilized in the region between successive rolling elements since separate retainers are associated with each rolling element, and this has an advantageous effect on the smoothness of running. Since the retainers are also connected to the flexible element in the lateral edge regions of the carrier belt, the necessary freedom for bringing together the rolling elements is simultaneously achieved in the region of the central portion of the carrier belt. The resultant increase in the number of rolling elements per length unit, i.e. the resultant increase in the density of rolling elements, has a desirable effect on the load-carrying or load-bearing capacity of the chain of rolling elements.

It should be noted that the chain of rolling elements according to the invention, in particular its carrier belt, is simple to produce. Thus, the carrier belt can be produced in one piece, for example from a plastics material from the group comprising elastomers such as, for example, polyurethane, Hytrel or the like, preferably as an injection moulding.

According to a first variation, in the longitudinal direction of the at least one flexible element before and after at least one rolling element there are provided in each case at least two retainers associated with this rolling element. These retainers can be arranged on both sides of the central portion of the carrier belt in its lateral portions so that each rolling element, for example each ball, is received in a cage formed by at least four retainers.

If two retainers, of which one is provided above a main plane of the carrier belt and one is provided below this main plane, are arranged directly above and below one another, these two retainers provide a common retaining face extending over a large angular range which ensures that the rolling element is retained securely.

The rolling element can be retained particularly securely if it is retained on the one hand by the peripheral face of the recess receiving this rolling element and on the other hand by a plurality of, preferably at least four, combinations of retainers, which are distributed, preferably uniformly, around the periphery of this recess and of which the retaining faces extend in each case above and below the main plane of the carrier belt, i.e. above and below the peripheral face of the recess.

According to a second variation, at least one of the retainers can be designed as a full ring or half ring which extends in the form of an arc from one edge portion to the other respective edge portion above and/or below a main plane of the carrier belt. With this variation, the retainers in the region of the longitudinal centre of the main plane of the carrier belt again do not rest on the rolling elements so the rolling elements can be brought very close to one another.

Owing to the arcuate design of the retainer, furthermore, extensive contact between the retainer and the rolling element and therefore secure retaining of the rolling element are achieved.

An arrangement which is particularly flexible with respect to bending round an axis extending substantially parallel to the transverse direction of the carrier belt can be achieved if a half ring associated with a first rolling element and a second half ring adjacent to this first half ring and associated with the subsequent rolling element are arranged on different sides of the main plane of the carrier belt. With this design, there is in fact no risk that these two retainers will come into contact during bending of the carrier belt and thus limit the attainable bending angle.

To ensure that the rolling elements are retained securely in the aforementioned variations, even when the chain of rolling elements is stressed, for example in the deflection portions of the channel, it is proposed that the at least one flexible element is designed in the form of a ladder with two longitudinally extending spar elements and a plurality of rung elements connecting these spar elements and extending substantially in the transverse direction of the carrier belt. In the first variation, these rung elements alone produce the connection between the two spar elements and the retainers arranged thereon. In the second variation, the arcs projecting from the main plane of the guide belt are strengthened in the transverse direction of the carrier belt by these rung elements. For example, a load-induced deformation of a circular retainer to an ellipse is at least complicated if not completely prevented by a rung element of this type. Furthermore, the rung elements which can be relatively thin in design in the central portion of the carrier belt in the main plane thereof can form an additional securing means which prevents direct contact between successive rolling elements even when the chain of rolling elements is loaded and therefore averts excessive wear of these rolling elements.

According to a further variation, at least one of the retainers is designed as a full disc or half disc which extends between the edge portions above and/or below a main plane of the carrier belt. With this variation, it is preferred with respect to maximum flexibility of the carrier belt in the region between two successive rolling elements if the at least one flexible element comprises only two flexible strip elements which are associated with the two edge portions of the carrier belt but not bars transversely connecting these strip elements. Contact between two successive rolling elements in the region of the central portion of the main plane of the carrier belt is prevented therein by the two actual disc-shaped retainers which have a small wall thickness of at most about 0.2 times rolling element diameter, preferably at most about 0.1 times rolling element diameter in the region of the central portion of the main plane of the carrier belt in the longitudinal direction thereof to allow a close succession of rolling elements.

In all the above-discussed variations, it is possible, despite the close succession of rolling elements, for two adjacent retainers associated with successive rolling elements to have predetermined spacing from one another in the main plane of the carrier belt. As a result, only the material of the strip or spar elements and optionally of the rung elements needs to be deformed during bending of the carrier belt round an axis extending parallel to the transverse axis in the region between two successive rolling elements while the retainers are subjected to substantially no deformation even in the region of their connection to the strip or spar and rung elements.

With small spacing, which even disappears in extreme cases, between the retainers in the main plane of the carrier belt, high flexibility of the carrier belt in the region between successive rolling elements can be ensured if the spacing between two adjacent retainers associated with successive rolling elements increases as the distance from the main plane of the carrier belt increases. This avoids the risk of contact between adjacent retainers which restricts the bending angle, even in the case of small bending angles. It is particularly preferred if the spacing between the two retainers, at least in a portion adjacent to the main plane of the carrier belt, increases monotonically as the distance from the main plane of the carrier belt increases.

According to a further aspect, the above-described object of the invention is achieved by a chain of rolling elements comprising a plurality of rolling elements arranged in close succession and an elongate guide belt with a plurality of recesses for receiving the rolling elements, a plurality of spacers and at least one elongate flexible element for connecting the spacers, wherein the guide belt can be split into two lateral edge portions and a central portion connecting them, wherein moreover the spacers have a contact face for a leading rolling element at a leading end and a contact face for a trailing rolling element at a trailing end, and wherein the contact faces associated with a rolling element are part of a cylindrical face of which the diameter is greater than the diameter of the rolling elements. The term close succession of rolling elements is again interpreted as a succession in which the ratio of the diameter of the rolling elements to the spacing between centres of successive rolling elements is less than 1:1.5, preferably less than 1:1.25, most preferably approximately 1:1.

In this chain of rolling elements, the rolling elements are not retained but merely guided in the recesses of the guide belt so the guide belt, in particular in the region of the deflection parts of the race, cannot exert on the rolling elements a bend-induced force which influences the movement thereof, and this is accompanied by corresponding low noise generation. The close succession of rolling elements is ensured, as in the chain of rolling elements known from JP-A-5-52217, in that, between two successive rolling elements, there is arranged only a single element which, in contrast to JP-A-5-52217, however, does not have a retaining function but merely a guiding and spacing function.

For introducing the above-described chain of rolling elements, the guide belt received in an assembly tube and already equipped with rolling elements can be brought toward the channel of the linear guide unit and can be transferred directly from the assembly tube into the channel. Simple assembly of the chain of rolling elements according to the invention is therefore ensured according to the further aspect of the invention even though the rolling elements are not retained in the guide belt.

In a development of this chain of rolling elements which merely guides the rolling elements it is proposed that the cylindrical face extends over a greater height in the central portion of the guide belt than in the two lateral portions, the cylindrical face additionally or alternatively extending in the central portion of the guide belt over a height which is smaller than the diameter of the rolling element guided by this cylindrical face, but preferably greater than the radius thereof.

According to a further aspect, the invention relates to a chain of rolling elements comprising a plurality of rolling elements arranged in close succession and an elongate carrier belt with a plurality of recesses for receiving the rolling elements, a plurality of retainers or spacers for the rolling elements received in the recesses and at least one elongate flexible element for connecting the retainers or spacers, wherein the two longitudinal ends of the carrier belt are prepared for connection to a further longitudinal end or are connected to a further longitudinal end. With this design of the chain of rolling elements, for which independent protection is sought, hooking or blocking of the respective leading end of the guide belt in the rolling element channel and, in particular, the deflecting portions thereof can at least be complicated, if not completely avoided. Smoother running of a guide device equipped with at least one such chain of rolling elements, for example a linear guide, can therefore be achieved.

The further longitudinal end can be the other respective longitudinal end of the same carrier belt. Alternatively, however, the further longitudinal end can be a longitudinal end of a further carrier belt. The last-mentioned alternative allows long chains of rolling elements to be assembled in modular fashion from a plurality of shorter chains of rolling elements of identical or different length and/or design.

According to a variation, the ends of the chain of rolling elements or the chains of rolling elements can be mutually connected in an interlocking manner. For example, coupling elements which can be mutually connected at the two longitudinal ends and can preferably be detachably mutually connected can be provided for this purpose. The coupling elements can comprise, for example, a coupling recess and a coupling peg designed to engage in the coupling recess.

The two longitudinal ends of the carrier belt can additionally or alternatively also be mutually connected in a non-positive manner, for example by welding, adhesion or the like.

According to a further aspect the invention relates to an arrangement of chains of rolling elements comprising a plurality of chains of rolling elements. The individual chains do not necessarily have to have the same construction. On the contrary it is possible to use chains of rolling elements having retainers and chains of rolling elements having spacers. Additionally, the individual chains in the rolling element revolutions can succeed one another in a loose arrangement, i.e. without being linked, or in a connected arrangement. Of course, mixed forms are also possible, i.e. in which some of the individual chains are connected with each other, whereas they are not connected with other individual chains or/and groups of individual chains. Such an arrangement of chains of rolling elements has the advantage that it can easily be manufactured and stored, as for each application an arrangement of chains of rolling elements having a suitable length and shape can be modularly put together from a plurality of prefabricated shorter chains of rolling elements having the same or a different length and/or shape.

To avoid any misunderstanding it should be pointed out that when, in connection with the present invention, a "plurality" of rolling elements and/or chains of rolling elements is mentioned, a plurality always refers to at least two such rolling elements and/or chains of rolling elements.

According to a further aspect, the invention relates to a chain of rolling elements, which comprises a plurality of rolling elements arranged in close succession as well as an elongate guide belt with a plurality of spacers and at least one elongate flexible connecting element, which is connected with lateral edge portions of the spacers, in such an arrangement that, between the spacers projecting in a transverse direction from the connecting element, a plurality of recesses are formed for the loose reception of the rolling elements. Such chains of rolling elements are used, for example, in linear guides, such as ball or roll guides, and in linear drives such as ball thread drives.

Above two solution principles are discussed, which both serve for increasing the load-bearing capacity and smooth running of chains of rolling elements. In both cases, high load-bearing capacity is achieved by a close succession of the rolling elements. On the one hand, it is proposed that when the guide belt comprises retaining elements, which prevent the rolling elements from falling out of the guide belt, special retaining elements are assigned to each of the rolling elements. As a result of this measure, the number of points facilitating bending of the guide belt is doubled. The resulting flexibilization of the guide belt has the effect of ensuring that the guide belt cannot influence the operation of the rolling elements in a noise-producing manner. On the other hand, it is proposed that the rolling elements should no longer be retained in the recesses of the guide belt but loosely taken up, i.e. at most be guided. The resulting possibility of relative movements of the guide belt and rolling elements in the running channel, i.e. the resulting decoupling of guide belt and rolling elements, at least in a height direction extending orthogonally both in the longitudinal and transverse directions, has a beneficial effect on the development of noise. A drawback of the last-named embodiment, however, might be a relatively high wear.

For this reason, it is another object of the invention to further improve a chain of rolling elements with rolling elements loosely taken up in the recesses of the driving belt in respect of a higher working life or a higher total period of operation.

This object is achieved, in accordance with a first sub-aspect, by a generic chain of rolling elements, in which the dimension of the spacers taken in the longitudinal direction of the guide belt is smaller in their lateral edge portions than the radius of the rolling elements.

In accordance with a second sub-aspect, this object is achieved by a generic chain of rolling elements, in which the connecting element between connecting sections with consecutive spacers comprises, in each instance, a free longitudinal section, the length of the free longitudinal sections being greater than the length of the connecting sections.

As a result of each of these two measures, flexibilization of the guide belt is achieved, however not by increasing the number of bending points but by reducing the length of the spacers stiffening the connecting elements. That this measure leads to an increase in working life, could not be expected at the outset. A reduction in possible contact surfaces between rolling elements and guide belt as a result of friction inevitably causes higher wear on the remaining contact surfaces. Surprisingly, however, it has been shown that this effect on the lateral contact surfaces, subject to special load, of the rolling elements on the connecting elements is overcompensated by their greater flexibility and the associated reduction in bending stress.

It should be noted that as above, by a close succession of rolling elements a succession is understood, in which the ratio of the rolling element diameter to the distance between the center points of consecutive rolling elements is less than 1:1.5, preferably less than 1:1.25 and most preferably approximately 1:1.

Even greater flexibilization of the guide belt can be achieved by making the longitudinal dimension of the spacers in their lateral edge portions less than 50%, preferably less than 20%, of the radius of the rolling elements or by making the length of the free longitudinal sections double, preferably ten times, the length of the connecting elements.

An essentially unchanged size and shape of the recesses taking up the rolling elements can be secured by giving the guide belt an essentially ladder-like structure i.e. for example, by having the guide belt comprise at least two elongate flexible connecting elements spaced apart in the transverse direction, which receive the spacers between them.

As a further development of the invention, it is proposed that the surfaces of the spacers limiting the recesses extend essentially orthogonally to the longitudinal direction of the guide belt. This facilitates a particularly flexible construction of the guide belt since, as a consequence, the length of the connecting sections stiffening the guide belt corresponds only to the thickness of the spacers in their central portion separating the rolling elements. The value of this thickness is limited downwards only by the desired stability of the guide belt, which is preferably manufactured as a one-piece plastic part, advantageously in the injection molding process. Furthermore, this embodiment has the advantage that one and the same guide belt can be combined with different types of rolling elements, for example balls and rolls.

If the surfaces limiting the recesses of consecutive spacers exhibit, in the vicinity of the lateral edge portions of the spacers, a smaller distance between them than in the area of a central portion arranged between the edge portions, this is advantageous, both when balls are used as rolling elements and when rolls are used as rolling elements. When rolls are used, these all come into play with the spacers in the surface sections of lower longitudinal spacing so that it is also only in these surface sections of lower longitudinal spacing that there is any danger of the stripping of lubricant from the rolling element surface. In the surface sections of greater longitudinal spacing, on the other hand, the surface of the rolling elements also remains securely wetted with lubricant when passing the spacers so that the lubrication of the running channel in which the chain of rolling elements moves, is guaranteed.

When balls are used, the problem of lubricant stripping occurs only to a non-critical extent as a consequence of the smaller contact surface with the spacers. In this case, the advantage of surface sections of greater longitudinal spacing lies in the fact that the closeness of the succession of balls and thus the load-bearing capacity of the chain of rolling elements can be increased. Since the surface sections of greater longitudinal spacing only have to bridge the central portion of the spacers, the spacers can be made correspondingly thinner in their central portion than would be possible with a spacer, which extends over the entire distance between both elongate flexible connecting elements with constant thickness.

In the case of the use of balls as rolling elements, furthermore, it is conceivable that the surface sections of greater longitudinal spacing can be formed at least partially as part of a cylinder surface, the cylinder axle thereof extending advantageously in a direction proceeding orthogonally to both the longitudinal direction and transverse direction of the guide belt.

In order to be able to prevent any stripping of lubricant from the running surfaces of the running channel, in which the chain of rolling elements moves, it is proposed that at least one part of the spacers exhibits a height, which is smaller than the diameter of the rolling elements. Additionally or alternatively, however, it is also possible for at least some of the spacers to exhibit on boundary edges, which limit the spacer in a height direction orthogonal to both the longitudinal direction and the transverse direction of the guide belt, recesses, which facilitate the passage of lubricant when the chain of rolling elements moves in the longitudinal direction of the guide belt.

According to a further aspect, the invention relates to a arrangement of chains of rolling elements, comprising at least one chain of rolling elements with a plurality of rolling elements and an elongate supporting and/or guiding belt, which exhibits a plurality of recesses for the take-up of the rolling elements, a plurality of retainers and/or spacers for the rolling elements received in the recesses and at least one elongate flexible element for connecting of the retainers and/or spacers, whereby, between a trailing longitudinal end of a supporting and/or guiding belt and a trailing end of a supporting and/or guiding belt, a separating rolling element is arranged keeping these two longitudinal ends at a distance. The two longitudinal ends may belong to one and the same chain of rolling elements as well as to two different chains of rolling elements.

From the state of the art, on the one hand, arrangements of chains of rolling elements are known in which the leading longitudinal end and the trailing longitudinal end are fixed together, for example by a locating mechanism or such like. On the other hand, arrangements of chains of rolling elements known, in which the two longitudinal ends lie adjacent to one another with relatively free movement between them. The first-named embodiment has the disadvantage that corresponding room must be provided for the linking of the two longitudinal ends, which impairs the load-bearing capacity of the known arrangement of chains of rolling elements, at least in the area of the connection of the two longitudinal ends. The second-named embodiment has the disadvantage that the space between the longitudinal ends permits uncontrolled elongation of the chain of rolling elements, which may lead to fracture.

In contrast, the solution according to the invention specified above prevents such uncontrolled elongation in an amazingly simple manner. Furthermore, the solution of the invention makes it possible for the rolling elements to be arranged consecutively also in the area of the transition from a leading to a trailing chain end, with the same closeness with which they are also arranged over the remaining entire length of the chains of rolling elements. Thus the arrangement of chains of rolling elements exhibits high load-bearing capacity in the connection area as well.

At this point attention is drawn to the fact that the idea of providing a separating rolling element between consecutive longitudinal ends of chains of rolling elements, is not restricted to chains of rolling elements, in which the rolling elements are taken up loosely in the recesses of the guide belt, but may also be implemented in those chains of rolling elements, in which the rolling elements are held in these recesses.

If an end surface of at least one of the longitudinal ends, preferably at least the trailing longitudinal end, is formed at least partially in accordance with the external peripheral surface of the separating rolling element, the separating rolling element may be brought into guiding and/or centering engagement with this longitudinal end. The consequence is that the deflection of the guide belt in a curved section of the running channel does not at least not exclusively result from the interaction of the guide belt with the boundary walls of the running channel. Rather this longitudinal end is carried along and/or deflected by the associated separating rolling element, which has a beneficial effect on the smooth and quiet running of the rolling element chain arrangement according to the invention and/or of the chain of rolling elements according to the invention.

BRIEF DESCRIPTION OF THE DRAWINGS

Embodiments of the invention will be described in more detail hereinafter with reference to the accompanying drawings, in which:

FIG. 1 shows a first embodiment of the chain of rolling elements according to the invention, wherein FIG. 1*a* is a perspective view of the chain of rolling elements;

FIG. 1*b* is a plan view of the chain of rolling elements according to FIG. 1*a;*

FIG. 1*c* is a side view of the chain of rolling elements according to FIG. 1*a;* and FIG. 1*d* is a front view of the chain of rolling elements according to FIG. 1*a;*

FIG. 2 shows a further embodiment of a chain of rolling elements according to the invention in views similar to FIG. 1, wherein FIG. 2*c* is a sectional side view along line II—II in FIG. 2*b;*

FIGS. 3 and 4 show further embodiments of chains of rolling elements according to the invention in views similar to FIG. 1;

FIGS. 5 and 6 show further embodiments of chains of rolling elements according to the invention in views similar to FIG. 2;

FIG. 7 shows views similar to FIG. 6*c* (FIG. 7*a*), FIG. 6*b* (FIG. 7*b*) and FIG. 6*d* (FIG. 7*c*) of a further chain of rolling elements according to the invention with connectable ends;

DETAILED DESCRIPTION OF THE PREFERRED EMBODIMENTS

Figures 6, 6A:
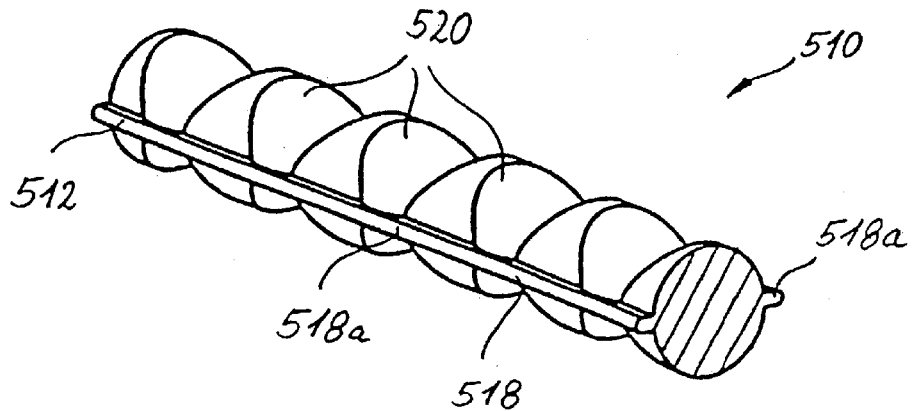
Figure 6B:
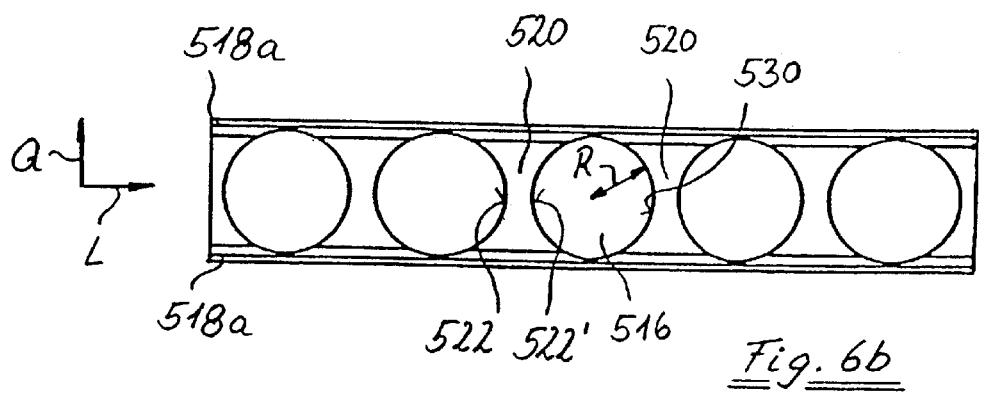
Figures 6C, 6D:
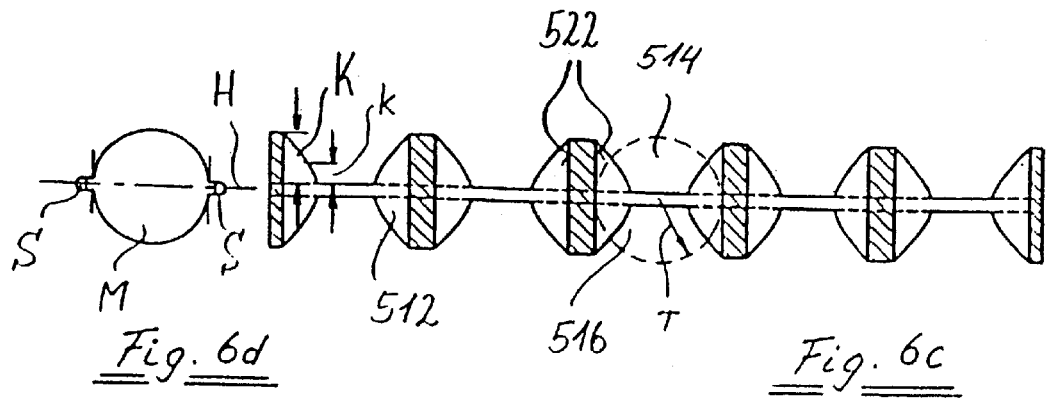

In FIG. 1, a chain of rolling elements according to the invention is designated generally by 10. It comprises a carrier belt 12 and a plurality of rolling elements, for example balls 14, which are received in recesses 16 in the carrier belt 12. The carrier belt 12 is formed by a flexible connecting belt 18 and retainers 20 which are arranged thereon and retain the balls 14 in the recesses 16.

In the embodiment according to FIG. 1, eight such retainers 20 are associated with each ball 14, namely four retainers 20*a*, 20*b*, 20*c* and 20*d* arranged above a main plane H (see FIG. 1*d*) and four retainers 20*a'*, 20*b'*, 20*c'* and 20*d'* arranged below the main plane. Each of the retainers 20 has a spherically concave retaining face 22 of which the radius of curvature is adapted to that of the associated ball 14.

In addition, in the embodiment according to FIG. 1, as shown in particular in FIG. 1*a,* a retainer arranged above the main plane H of the connecting belt 18, for example the retainer 20*c,* and a retainer arranged below the main plane H, for example the retainer 20*c'* are arranged directly above one another in each case so their two retaining faces form a common large retaining face extending over a relatively large angular range along the surface of the ball 14. Overall, the ball 14 is therefore retained, in the embodiment according to FIG. 1, by four such combinations of retainers 20*a*/20*a'*, 20*b*/20*b'*, 20*c*/20*c'* and 20*d*/20*d'*, which are distributed uniformly round the periphery of the recess 16 and reliably clasp the ball 14. The ball 14 is additionally retained by the peripheral face of the recess 16.

In a variation of the embodiment shown in FIG. 1, it is also possible to provide only two such combinations of retainers which are diametrically opposed to one another with respect to the ball 14. They could be, for example, the combinations of retainers 20a/20a' and 20c/20c' or the combinations of retainers 20b/20b' and 20d/20d'.

As shown in FIG. 1d, the connecting belt 18 can be split roughly schematically into three portions, namely a central portion M and two lateral portions S, in a transverse direction Q extending orthogonally to the longitudinal direction of the carrier belt 12 and lying in the main plane H.

In the embodiment according to FIG. 1, the retainers 20 are arranged merely in the lateral portions S of the connecting belt 18 and therefore completely clear the central portion M. The recesses 16 for receiving the balls 14 can therefore be brought close together (see FIG. 1b). This allows a very large number of balls 14 to be arranged in a predetermined length portion of the carrier belt 12, i.e. a high ball density to be achieved, and this is advantageous for the load-carrying capacity of the ball chain 10.

In the embodiment according to FIG. 1, moreover, each retainer 20 is associated with a single ball 14 so at least two retainers, for example the retainers 20d and 20a, are provided in each case in a longitudinal portion B of the connecting belt 18 (see FIG. 1b). The retainers 20d and 20a have minimum spacing d from one another in the region of the main plane H of the connecting belt 18. In addition, the spacing between the two retainers increases as the height h above the main plane H of the connecting belt 18 increases. In the embodiment according to FIG. 1, this spacing even increases monotonically, i.e. it always increases from the main plane H.

The resultant convex course of the surfaces 20d1 and 20a1 of the retainers 20d and 20a ensures that these retainers, during bending of the carrier belt 12 about an axis extending in the transverse direction Q, interact with one another in a manner which prevents further bending only on attainment of a predetermined bending angle α. Therefore, the connecting belt 18 has high flexibility not only in the regions K of lateral contact on the balls 14 but also in the regions B between two successive balls 14 in each case.

The connecting belt 18 has a substantially flat configuration in the embodiment according to FIG. 1. As shown, in particular, in FIG. 1d, the cross section of the connecting belt 18 is substantially rectangular, the rectangular shape having a very long extension in the main plane H and only a small height. It should be noted that this is merely one possible configuration for the cross section of the connecting belt 18. Other configurations are basically also conceivable, for example configurations with curved surfaces on which the retainers 20 are arranged. Therefore, the connecting belt 18 could have, for example, a lancet-shaped cross section rather than a rectangular cross section.

It should be added that the connecting element 18 is designed in the form of a ladder in the embodiment according to FIG. 1 with two spar elements 18a extending in the longitudinal direction L and a plurality of rung bars 18b which extend in the transverse direction Q and separate the recesses 16 from one another. The rung bars 18b also have the task of preventing direct contact between two successive balls 14 and therefore excessive wear of these balls 14.

FIG. 2 shows a further embodiment of a chain of rolling elements according to the invention which substantially corresponds to the embodiment according to FIG. 1. Therefore, parts which are similar in FIG. 2 are provided with identical reference numerals to FIG. 1 but increased by the number 100. In addition, the embodiment according to FIG. 2 is described hereinafter only in so far as it differs from the embodiment according to FIG. 1, explicit reference being made to the description thereof.

As in the embodiment according to FIG. 1, the carrier belt 112 in the chain of rolling elements 110 according to FIG. 2 comprises eight retainers 120 in each case which are associated with a recess 116 for receiving a ball 114. The retainers 120 are in turn arranged above one another in pairs (see for example the retainers 120a and 120a' in FIG. 2c) and therefore form four clasps with retaining faces 122. According to the embodiment in FIG. 1, the retainers 120 are also arranged in lateral portions S of the connecting belt 118 while the connecting belt 118 is free from attachments in the central portion M, allowing the recesses 116 to be brought close together (see FIG. 2b). As shown in FIG. 2c, the limiting faces 120d1 and 120a1 of mutually adjacent retainers 120d and 120a are also convex in design to prevent a premature interaction between the retainers 120d and 120a which would limit the bending angle, during bending round the transverse axis Q.

The main difference between the embodiments according to FIG. 1 and FIG. 2 is that, with the chain of rolling elements 110 according to FIG. 2, the retainers 120 are orientated substantially in the longitudinal direction L of the carrier belt 112 while the retainers 20 according to FIG. 1 are orientated along a straight line G extending through the centre of the ball 14 and orthogonally to the main plane 18 (see FIG. 1b). The main consequence of this orientation is that two adjacent retainers 120d and 120a make contact along a contact line whereas the retainers 20d and 20a according to FIG. 1 at most have point contact. Owing to the convex design of the limiting faces 120d1 and 120a1 described with reference to FIG. 2c, this linear contact in the main plane H does not represent a problem which limits the bending angle.

FIG. 3 shows a further embodiment of a chain of rolling elements according to the invention. It substantially corresponds to the embodiment according to FIGS. 1 and 2. In FIG. 3, therefore, similar parts are provided with identical reference numerals to FIG. 1, but increased by the number 200. Furthermore, the embodiment according to FIG. 3 is described hereinafter only in so far as it differs from the previous embodiments, explicit reference being made to the description thereof.

In the chain of rolling elements 210, the retainers 220 provided for retaining the balls 214 are designed in each case as an annular element, which has a spherical concave retaining face 222 on its side facing the ball 214. The annular element 220 extends orthogonally to the longitudinal direction L and orthogonally to the main plane H above and below the main plane H of the connecting belt 218 in the form of an arc from one lateral portion S of the connecting belt 218 to the other while bridging the central portion M of the connecting belt 218 associated with the lumen $220_1$ of the respective retainer 220. The balls 214 arranged in the recesses 216 of the carrier belt 212 can therefore be brought close together so that they penetrate through the lumen $220_1$ at the limiting faces 222d1 and 222a1 remote from the retaining faces 222 and are kept at a safety margin by the rungs 218b of the connecting belt 218.

Two retainers 220a and 220d are associated with each ball 214, mutually adjacent retainers in a region B between two balls 214 having predetermined mutual spacing d which does not disappear and thus ensures the desired flexibilisation of the carrier belt 212. A bevel $220_2$ of the type shown at the upper end of the right-most retainer in FIG. 3c allows bending angles which are sufficiently great for practical use.

The embodiment of the chain of rolling elements according to FIG. 4 substantially corresponds to that according to FIG. 3. Therefore, similar parts in FIG. 4 are provided with identical reference numerals to FIG. 3 but increased by the number 100, i.e. increased by the number 300 in comparison with FIG. 1. In addition, the embodiment according to FIG. 4 will be described hereinafter only in so far as it differs from the embodiment according to FIG. 3, explicit reference being made to the description thereof.

The chain of rolling elements 310 according to FIG. 4 differs from the chain of rolling elements 210 according to FIG. 3 in that, instead of the full ring retainers 220, half ring retainers 320 are provided which extend orthogonally to the longitudinal direction L and orthogonally to the main plane H either completely above or completely below the main plane H of the connecting belt 318.

Each recess 316 for receiving a ball 314 is associated with two such half ring retainers 320 and 320' of which one 320 is arranged above the main plane H and one 320' below the main plane H so the ball 314 is retained securely in the recess 316 in the carrier belt 312. The lumen $320_2$ of the half ring retainers 320 in turn allows successive balls 314 to be brought close together. In addition, the rung element 318b ensures the minimum spacing between balls 314 required for ensuring minimal wear.

The mutually adjacent retainers 320 in region B are arranged on different sides of the main plane H of the connecting belt 318. Therefore, there is no risk of contact between the two retainers 320 which would limit the bending angle during bending of the carrier belt 312 about an axis extending parallel to the transverse direction Q.

It should be added with respect to the embodiments in FIGS. 1 to 4 that the rolling elements 14, 114, 214 and 314 are retained by the respective peripheral face 16a, 116a, 216a and 316a of the recesses 16, 116, 216 and 316 respectively extending in the main plane H in addition to the retaining faces 22, 122, 222 and 322 respectively provided by the retainers 20, 120, 220 and 320 respectively projecting from the main plane H of the connecting belt 18, 118, 218 and 318 respectively, to ensure that the rolling elements are retained securely in the recesses.

The embodiment according to FIG. 5 is very similar to the embodiment according to FIG. 3. Therefore, similar parts in FIG. 5 are provided with identical reference numerals to FIG. 3 but increased by the number 200, i.e. increased by the number 400 in comparison with FIG. 1. In addition, the embodiment according to FIG. 5 will be described hereinafter only in so far as it differs from the embodiment according to FIG. 3, explicit reference being made to the description thereof.

In contrast to the chain of rolling elements 210 according to FIG. 3, the retainers 420 of the carrier belt 412 of the chain of rolling elements 410 according to FIG. 5 are designed as uninterrupted full disc elements having a spherical concave recess 422 on their side facing the respective ball 414. In the region of the main plane H of the carrier belt 412, the retainers 420 have a very thin wall thickness $420_3$ (see FIG. 5c) which preferably does not disappear and of which the value t is at most about 0.2 times rolling element diameter, preferably at most about 0.1 times rolling element diameter.

A further distinction between the embodiments in FIG. 3 and FIG. 5 is that the connecting belt 418 of the chain of rolling elements 410 according to FIG. 5 only has two strip elements 418a which are mutually connected merely by the retainers 420. Therefore, there are no rung bars corresponding to the rung bars 218b. The close bringing together of successive balls 414 is facilitated by the absence of these bar portions, wherein the safety function of the bar can be transferred to the thin material skin $420_3$ of the retainers 420 in the embodiment according to FIG. 5.

The absence of the respective rung bar has also proven advantageous with respect to the flexibilisation of the carrier belt 412 in the region B between two successive balls 414 or recesses 416 because only the material of the lateral strip 418a has to be bent. The description of the embodiment according to FIG. 3 applies with respect to the limiting of the bending angle, reference again being made to the possibility of a bevel $420_2$ which is shown roughly schematically in the right-most retainer 420 in FIG. 5c.

FIG. 6 shows a further embodiment of a chain of rolling elements 510 according to the invention. The chain of rolling elements 510 comprises a guide belt 512 and a plurality of rolling elements, for example balls 514. The guide belt 512 is assembled from a plurality of spacers 520 and two strip elements 518a mutually connecting these spacers 520. The spacers 520 have, both on their side leading in the longitudinal direction L and on their side trailing in the longitudinal direction L, a respective guide face 522 or 522' for a leading or a trailing rolling element 514. Two adjacent spacers 520 and the two strip elements 518a limit recesses 516 for receiving a respective ball 514. The faces surrounding the recess 516, in particular the contact faces 522, 522' are designed as part of a cylindrical face 530 of which the radius R is greater than the radius r of the balls 514.

Therefore, the guide belt 512 and the spacers 520 are unable to exert a retaining function on the rolling elements 514 but merely serve to guarantee a safety margin between two successive rolling elements 514 so they do not wear excessively owing to mutual friction. In addition, the guide belt 512 is unable to exert a force on the rolling elements 514 directed orthogonally to the main plane H, so the rolling elements are able to move without obstruction, in particular in the deflection portions of the orbit, which is desirable with respect to noise generation.

The cylindrical face 530 has a greater height K in the central portion M of the guide belt 512 than in the two lateral portions S. More precisely, the height k of the cylindrical face 530 decreases from the central portion M to the lateral portions. The maximum value K of the height of the cylindrical face is smaller than the diameter 2r of the rolling element 514 guided by this cylindrical face 530 so that the guide belt 512 is able to move, as far as possible without friction, in the race of a linear guide unit and therefore obstructs the running of the rolling elements as little as possible. In addition, however, this maximum value K should be greater than the radius r of the rolling elements 514 so that secure entrainment between guide belt 512 and rolling elements can always be ensured.

FIG. 7 shows a further variation of chains of rolling elements according to the invention in the example of a chain of rolling elements designed substantially similarly to the chain of rolling elements 510 according to FIG. 6. It is mentioned at this point that the use of this variation is not restricted to the chain of rolling elements 510 according to FIG. 6 but can also be used in the chains of rolling elements 10, 110, 210, 310, 410 according to FIGS. 1 to 5.

The chain of rolling elements 610 according to FIG. 7 substantially corresponds in construction, as already mentioned, to the chain of rolling elements 510 according to FIG. 6. In other words, it comprises a plurality of spacers 620 which are mutually connected by two flexible strip elements 618a and form therewith a guide belt 612 having a plurality of recesses 616 for receiving balls 614. In contrast to the guide belt 512 according to FIG. 6, the guide belt 612 according to FIG. 7 is designed in such a way at its two longitudinal ends 612a and 612b that these two longitudinal ends 612a and 612b or the corresponding longitudinal ends of two successive guide belts 612 can be detachably connected to one another. For this purpose, a coupling peg 640 is arranged at the right-hand longitudinal end 612a in FIG. 7 and a coupling recess 642 is provided in the other longitudinal end 612b into which the coupling peg 640 can be inserted, in particular hooked to connect the two longitudinal ends 612a and 612b.

The coupling recess 642 can be so designed that the coupling peg 640 is retained frictionally therein merely by the pull acting in the longitudinal direction of the chain of rolling elements 610. However, the inlet orifice 642a (see FIG. 7c) is preferably surrounded by a socket 642b into which the head 640a of the coupling nozzle 640 can be inserted in an interlocking manner. The depth of the recess 642b can be so dimensioned that disengagement of coupling nozzle 640 and coupling recess 642 when the chain of rolling elements 610 is mounted in a guide device, for example a linear bearing, is reliably prevented.

Figure 8:
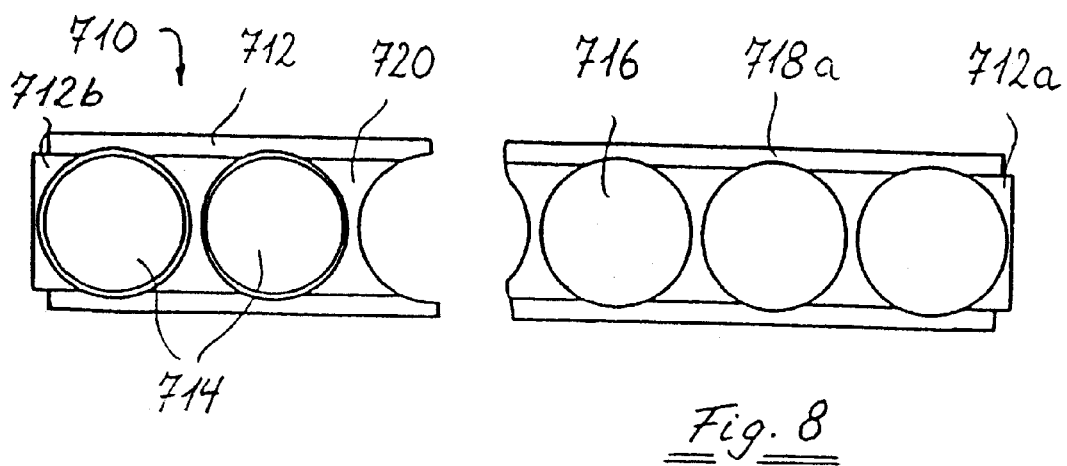
FIG. 8 shows a view similar to FIG. 7*b* of a further chain of rolling elements with connectable ends.

In the variation shown in FIG. 8, in which the guide belt 712 again comprises a plurality of spacers 720 which are connected to one another by two flexible strip elements 718 to form a plurality of recesses 716 for receiving balls 714, the two longitudinal ends 712a and 712b of the guide belt 712 are prepared for being stuck, welded or otherwise non-positively connected to one another or to a corresponding longitudinal end of a further guide belt. Explicit reference is made to the description of the foregoing embodiments.

It should also be noted that an interlocking as well as an additional non-positive connection between the two longitudinal ends of the guide belt for securing the interlocking joint is conceivable.

In all the above-described embodiments, the carrier or guide belt is preferably produced in one piece and from plastics material, for example as an injection moulding. Elastomers such as polyurethane, Hytrel or the like, for example, can be used as plastics materials.

Although ball chains are illustrated in all the above-described FIGS. 1 to 6, it is emphasised that the present invention can also be embodied in chains of rolling elements equipped with other types of rolling elements, for example rollers or the like.

Figure 9:
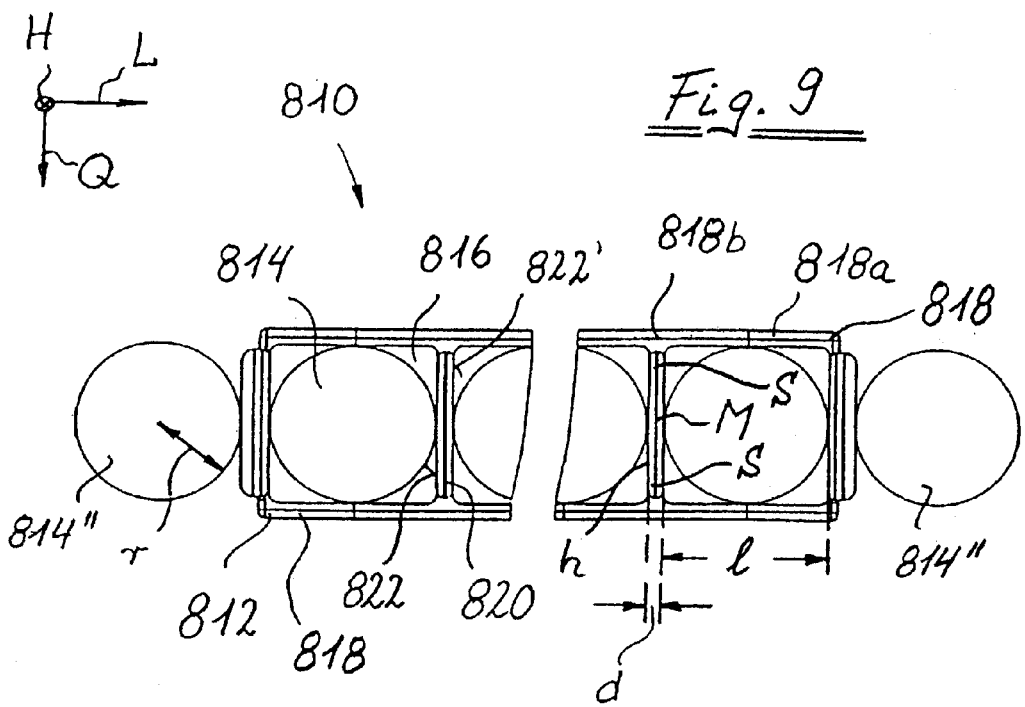
FIG. 9 is a top-view of a further embodiment of a ball chain of the invention.

FIG. 9 shows a further embodiment of a chain of rolling elements of the invention, whose construction is essentially the same as the chain 510 of rolling elements shown in FIG. 6. Analogous parts are therefore provided with the same reference symbols in FIG. 9 as in FIG. 6, however increased by a figure of 300. Furthermore, the embodiment shown in FIG. 9 is described in the following only to the extent to which it differs from the embodiment of FIG. 6, to the description of which your attention is otherwise expressly drawn.

In FIG. 9 a chain of rolling elements is designated generally with 810. It comprises a guide belt 812 and a plurality of rolling elements 814, for example balls. The guide belt 812 essentially has a ladder-like construction with two flexible ladder struts 818 extending in the longitudinal direction L of the chain 810 of rolling elements 814 and a plurality of ladder rungs 820 extending in the transverse direction Q. The struts 818 and rungs 820 form recesses 816 between them for the take-up of the balls 814. The struts 818 serve for the lateral guidance of the balls 814 while the rungs 820 serve as spacers, which prevent any direct contact between two consecutive balls 814 and thus any excessive wear of these balls 814.

It should be noted that the balls 814 are loosely taken up in the recesses i.e. the guide belt 812 and/or the spacers 820 cannot exert any retaining function on the balls 814. Rather the balls 814 fall out of the recesses 816 when the ball chain 810 is taken out of the running channel of a linear guide, for example a linear rail guide, or a linear drive, such as a ball thread drive. Furthermore, the guide belt 812 cannot exert any force on the balls 814 in a height direction H extending orthogonally both to a longitudinal direction L and to a transverse direction Q so that the balls 814 can move unchecked, in particular in the deflecting sections of the roller path. This has a beneficial effect, particularly on the development of noise.

In contrast with the embodiment shown in FIG. 6, the spacers 820 exhibit contact surfaces 822 and 822', which extend essentially orthogonally to the longitudinal direction L. As a consequence the balls 814 may be engaged with the spacers 820 at most in their respective central portion M but not in their respective two side sections S through which the spacers 820 are connected with connecting sections 818b of the struts 818. It is important that the thickness d of the spacers 820 in the longitudinal direction L is less, preferably significantly less, firstly than the radius r of the rolling elements 814 and secondly than the length I of the free line section 818a of the struts 818 between two consecutive spacers 820.

As a result of the comparatively large length I of the free length sections 818a, the guide belt 812 has, on the one hand, relatively high flexibility. On the other hand, the guide belt 812 can deform over a relatively large fraction of its total length around axes proceeding in parallel with the transverse direction Q, which reduces the specific bending load of the guide belt 812 per unit of length of the free length sections 818a available for deformation. The latter has an advantageous effect on the service life and/or total operational life of the guide belt 812 and thus of the entire rolling element chain 810.

Furthermore, it should be noted that the height h, measured in the height direction H, of the spacers 820 is preferably smaller than the diameter 2r of the balls 814. As a consequence any stripping of lubricant from the boundary walls of the running channel by the spacers 820 can be prevented to a large extent. Obviously the height h should be larger than the radius r of the rolling elements 814 in order to be able to guarantee constant and reliable entraining engagement between the guide belt 812 and the rolling elements 814.

Figure 10:
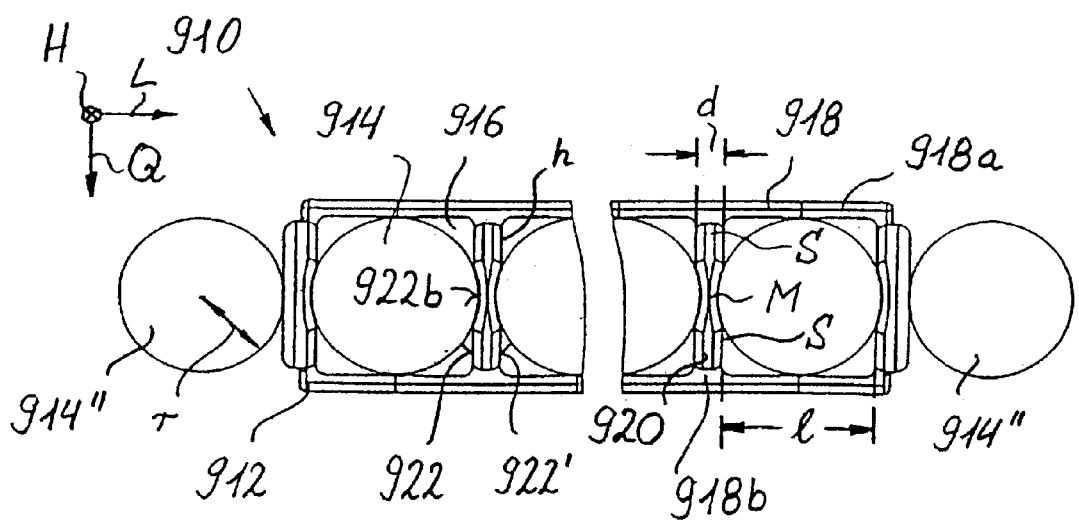
FIG. 10 is a view, similar to FIG. 9, of a further embodiment of a ball chain of the invention.

FIG. 10 shows a further embodiment of a chain of rolling elements of the invention, whose construction is essentially the same as the chain 810 of rolling elements shown in FIG. 9. Analogous parts are therefore provided with the same reference symbols in FIG. 10 as in FIG. 9, however increased by a figure of 100. Furthermore, the embodiment shown in FIG. 10 is described in the following only to the extent to which it differs from the embodiment of FIG. 9, to the description of which your attention is otherwise expressly drawn.

The chain 910 of rolling elements of FIG. 10 also comprises a plurality of rolling elements 914 and a ladder-like constructed guide belt 912 with struts 918 and rungs and/or spacers 920. The surfaces 922 and 922' limiting the recesses 916 for the take-up of the balls 914 proceed essentially orthogonally to the longitudinal direction L of the guide belt 912. The word "essentially" is only restricted insofar as the contact surfaces 922 and 922' exhibit, in the central portion M of the spacers 920, a slightly concave arching 922b, which corresponds to a part of a cylinder surface with a cylinder axle proceeding in the height direction H.

This slight arching 922b makes it possible to increase the closeness of the sequence of the balls 914 without threatening the stability of the guide belt 912. The side sections S of the spacers 920 can have a thicker construction in the longitudinal direction L, which increases the stability of the guide belt 912 as a whole and furthermore has technical manufacturing advantages in the production of the guide belt 912 as a one-piece injection-molded plastic part.

For the thickness d, which the spacers 920 exhibit in their side sections S and which, furthermore, correspond with the length of the stiffened strut sections 918b, and the length I of the free length sections 918a of the struts 918 of the guide belt 912, the dimensioning rules explained above for the example of FIG. 9 continue to apply. The same is also true for the height h of the spacers 920.

Figure 11:
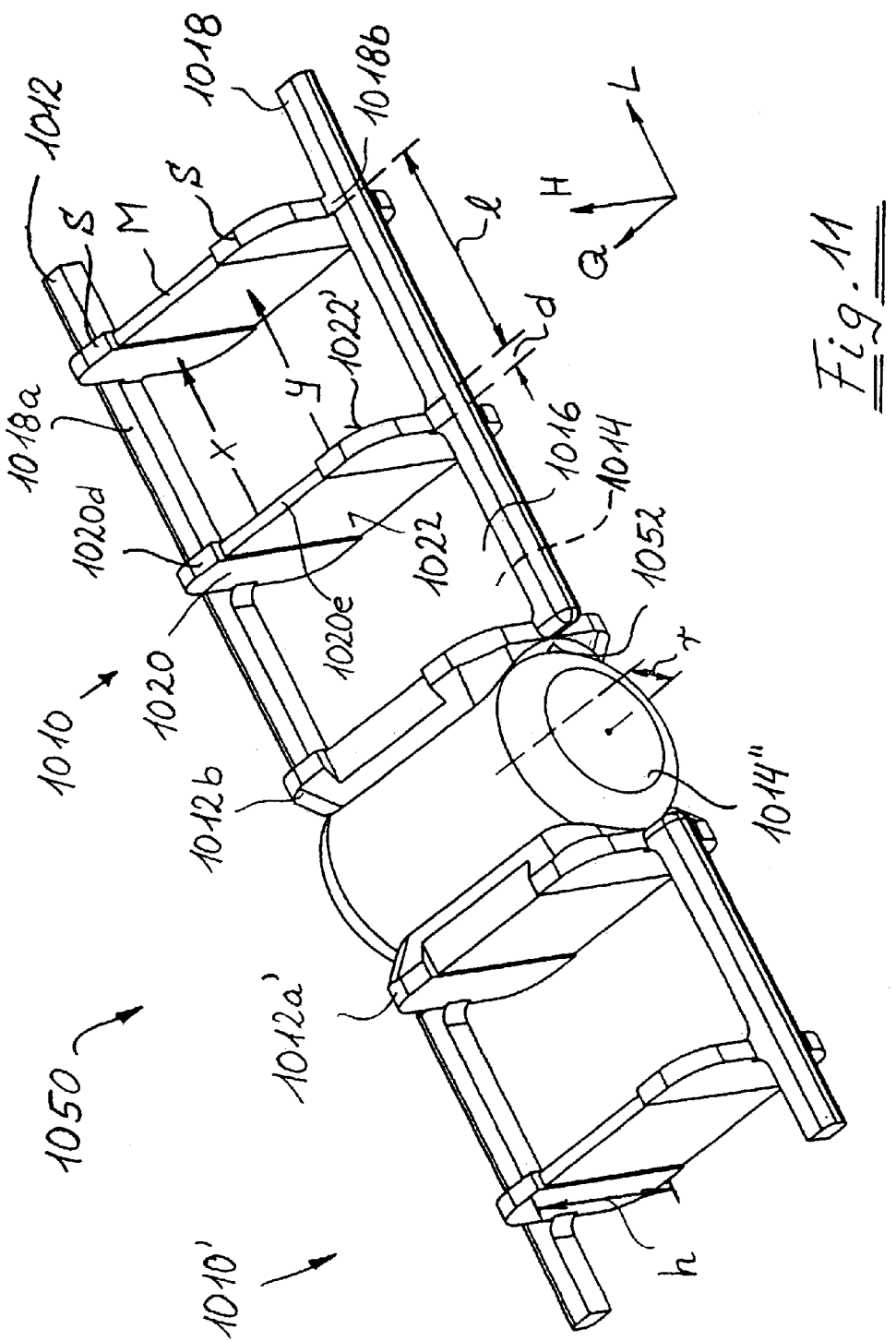
FIG. 11 is a perspective view of a roll chain of the invention.

FIG. 11 shows a further embodiment of a chain of rolling elements of the invention, which essentially corresponds with the chains of rolling elements 810 and 910 of FIGS. 9 and 10. For this reason analogous parts are provided in the following in FIG. 11 with the same reference symbols as in FIG. 9, although increased by the FIG. 200. Furthermore, the embodiment shown in FIG. 11 is described in the following only to the extent to which it differs from the embodiments of FIGS. 9 and 10, to the description of which your express attention is otherwise drawn.

The main difference between the chain 1010 of rolling elements of FIG. 11 and the chains of rolling elements 810 and 910 of FIGS. 9 and 10 lies in the fact that, in place of balls in the recesses 1016 of the ladder-like constructed guide belt 1012, rolls 1014 are received, which correspond with that roll 1014", which is located, according to FIG. 11, between the longitudinal ends 1012b of the chain 1010 of rolling elements and the longitudinal end 1012a' of a further analogously constructed chain 1010 of rolling elements. The ladder-like guide belt 1012 once again comprises struts 1018 and rungs and/or spacers 1020, whereby the rolls 1014 are once again received loosely in the recesses 1016 formed by these struts 1018 and the spacers 1020. The guide belt 1012 can thus once again exert no retaining function on the rolls 1014 but only keep these relatively distant from one another by means of spacers 1020 in order to prevent any excess wear due to mutual friction. Furthermore, the guide belt 1012 can also exert no force on the rolling elements 1014 in a height direction H proceeding orthogonally both to the longitudinal direction L and to the transverse direction Q.

As with the embodiments shown in FIGS. 9 and 10, the contact surfaces 1022 and 1022' of the spacers 1020 proceed essentially orthogonally to the longitudinal direction L, whereby the term "essentially" used with the embodiment of FIG. 11 is only limited to the extent that the stepped progression of these contact surfaces 1022 and 1022' occurs insofar as the distance x, taken in the longitudinal direction L, of these surfaces in the side sections S of the spacers 1020, exhibits a smaller value than the corresponding distance y in the central portion M of the spacers 1020. As a result of this stepped construction, the rolls 1014 can come in contact with the contact surfaces 1022 and 1022' only in the area of the side sections S of the spacers 1020 while they always have a minimum distance (y-x)/2 in the area of the central portions M from these surfaces. For this reason there is no danger, at least in the center distance M of the spacers 1020, of lubricant being stripped away from the surface of the rolls 1014.

Furthermore, in order to prevent any stripping of lubricant from the boundary walls of the running channel, in which the chain 1010 of rolling elements is received, the spacers 1020 exhibit in the area of their central portions M a lower height than their side sections S so that, in the area of the top and, respectively, bottom boundary edges 1020d a recess 1020e is provided in the central portion M, which facilitates the passage of lubricant in the longitudinal direction L.

For the thickness d, which the spacers 1020 exhibit in their side sections S and which, furthermore, corresponds to the length of the stiffened strut sections 1018b, and the length I of the free length sections 1018a of the struts 1018 of the guide belt 1012, the dimensioning rules described above in the example of FIG. 9 continue to apply. The same is also true for the height h of the spacers 1020.

In the above attention has already been drawn to the fact that FIG. 11 represents the sequence of two chains of rolling elements 1010 and 1010', i.e. a rolling element chain arrangement 1050. Between the longitudinal end 1012b of the chain 1010 of rolling elements and the longitudinal end 1012a' of the chain 1010' of rolling elements. a rolling element 1014 is located which keeps these two longitudinal ends apart. The provision of such a separating rolling element 1014 has the advantage that the sequence of rolling elements can also be continued over the connecting area of the two chains 1010 and 1010' of rolling elements with the same closeness as occurs in the area of the central portions of these chains of rolling elements. This means that this sequence of a plurality of chains of rolling elements does not have to be associated, even not in sections, with any losses of load bearing capacity of the arrangement of chains of rolling elements 1050. Only for the purpose of providing supplementary information, your attention is drawn to the fact that, in the embodiments shown in FIGS. 9 and 10 as well, such separating rolling elements, 814" and 914" respectively, are provided, whereby, however, the end spacers have a slightly thicker construction in respect of the total stability of the chain of rolling elements than central spacers.

Finally, it should be noted that, in the case of the embodiment shown in FIG. 11, the end spacers 1020 are formed with contact surfaces 1052, which have concave arching in accordance with the external peripheral surface of the separating rolling element 1014". The result of this is that the longitudinal ends 1012b and 1012a' respectively of the chains 1010 and 1010', respectively, of rolling elements can be carried along in the H direction in the curved sections of the running channel, for example in rolling element deflecting sections of the running channel, by the separating rolling elements 1014" as a result of the engagement with the concave surface 1052. The longitudinal ends 1012b and 1012a' thus do not need to be deflected by interaction with the boundary walls of the running channel. This once again has an advantageous effect on the quietness of the rolling element chain arrangement 1050.

What is claimed is:

1. A chain of rolling elements comprising
 a plurality of rolling elements arranged in close succession and
 an elongate guide belt with
  a plurality of recesses for receiving the rolling elements, a plurality of spacers, and
at least one elongate flexible element for connecting the spacers,
wherein the guide belt has two lateral edge portions and a central portion connecting them,
wherein the spacers have, at a leading end, a contact face for a leading rolling element and, at a trailing end, a contact face for a trailing rolling element, and
wherein the contact faces associated with a rolling element are part of a cylindrical face of which the diameter is greater than the diameter of the rolling elements.

2. The chain of rolling elements according to claim 1, wherein the cylindrical face extends over a greater height in the central portion of the guide belt than in the two edge portions.

3. The chain of rolling elements according to claim 1, wherein the cylindrical face in the central portion of the guide belt extends over a height which is smaller than the diameter of the rolling element guided by this cylindrical face, but preferably greater than the radius thereof.

4. The chain of rolling elements according to claim 1, wherein the at least one flexible element is designed in the form of a ladder with two spar elements extending in a longitudinal direction and a plurality of rung elements connecting these spar elements.

5. The chain of rolling elements according to claim 1, wherein the at least one flexible element comprises two flexible strip elements which are associated with the two edge portions.

6. The chain of rolling elements according to claim 1, wherein the carrier or guide belt is formed in one piece.

7. The chain of rolling elements according to claim 1, wherein the carrier or guide belt is produced from plastics material.

8. The chain of rolling elements according to claim 1, wherein the carrier or guide belt is injection moulded.

9. The chain of rolling elements according to claim 1, wherein the rolling elements are balls.

10. The chain of rolling elements according to claim 1, wherein the two longitudinal ends of the carrier belt are prepared for connection to a further longitudinal end or are connected to a further longitudinal end.

11. The chain of rolling elements according to claim 10, wherein the further longitudinal end is the other respective longitudinal end of the same carrier belt.

12. The chain of rolling elements according to claim 10, wherein the further longitudinal end is a longitudinal end of a further carrier belt.

13. The chain of rolling elements according to claim 10, wherein coupling elements which can be connected to one another are provided at the two longitudinal ends.

14. The chain of rolling elements according to claim 13, wherein the coupling elements can be detachably connected to one another.

15. The chain of rolling elements according to claim 13, wherein the coupling elements comprise a coupling recess and a coupling peg designed to engage in the coupling recess.

16. The chain of rolling elements according to claim 10, wherein the two longitudinal ends of the carrier belt are non-positively connected to one another.

17. A rolling element chain arrangement formed by a plurality of chains of rolling elements, comprising at least one chain of rolling elements according to one of the claims 1 to 9.

18. A chain of rolling elements, comprising:
a plurality of rolling elements, having a radius r, arranged in close succession in a direction L; and
an elongate guide belt having:
(1) a plurality of spacers, each of said spacers extending laterally in a direction Q substantially orthogonal to said direction L; and
(2) at least one elongate flexible connecting element extending longitudinally in said direction L and being connected with lateral edge portions of the spacers in such an arrangement that, between the spacers projecting in said transverse direction Q from the connecting element, a plurality of recesses are formed for the loose take-up of the rolling elements;
said spacers having on each side thereof facing an adjoining recess a rolling-element guide surface, said guide surface being configured (1) to contact a rolling element within said adjoining recess so as to guide rolling motion of said rolling element in the longitudinal direction L and (2) to be free of contact with said rolling element in a height direction H substantially orthogonal to both said longitudinal direction L and said transverse direction Q; and
the thickness of the lateral edge portions of the spacers in the longitudinal direction L is smaller than the radius r of the rolling elements,
whereby said rolling elements are guided, but not retained, within said recesses by said spacers and said rolling elements are substantially free of bending-induced forces from said guide belt.

19. The chain of rolling elements according to claim 18, wherein the longitudinal thickness of the spacers in their lateral edge portions is smaller than 50% of the radius r of the rolling elements.

20. The chain of rolling elements according to claim 19, wherein the connecting element between consecutive spacers comprises, in each instance, a free length section, and the length of each free length section is greater than the longitudinal thickness of the spacers.

21. The chain of rolling elements according to claim 20, wherein the length of each free length section is at least double the longitudinal thickness of the spacers.

22. The chain of rolling elements according to claim 18, wherein the guide belt comprises at least two elongate flexible connecting elements connected to respective opposite lateral edge portions of the spacers.

23. The chain of rolling elements according to claim 18, wherein the rolling-element guide surfaces of the spacers extend essentially orthogonally to the longitudinal direction L of the guide belt.

24. The chain of rolling elements according to claim 23, wherein the rolling-element guide surfaces of consecutive spacers have, in the vicinity of the lateral edge portions of the spacers, a smaller distance from one another than in the area of a central portion located between the edge portions.

25. The chain of rolling elements according to claim 18, wherein the rolling elements are balls.

26. The chain of rolling elements according to claim 25, wherein the rolling-element guide surfaces of the spacers, in a central portion arranged between the two lateral edge portions of the spacer, are formed at least partially as part of a cylinder surface.

27. The chain of rolling elements according to claim 18, wherein the rolling elements are rolls.

28. The chain of rolling elements according to claim 27, wherein the rolling-element guide surfaces of the spacers form, in the vicinity of the lateral edge portions of the spacers, contact surfaces for the rolling elements and have a predetermined minimum distance from the rolling elements in a central portion arranged between the lateral edge portions in the longitudinal direction L of the guide belt.

29. The chain of rolling elements according to claim 18, wherein one or more of the spacers have on boundary edges limiting said one or more spacers in said height direction H, orthogonal both to said longitudinal direction L as well as to said transverse direction Q of the guide belt, recesses which in the event of a movement of the rolling elements in the longitudinal direction of the guide belt allow the passage of lubricant.

30. The chain of rolling elements according to claim 18, wherein one or more of the spacers have a height in the direction H which is smaller than the diameter of the rolling elements.

31. A chain of rolling elements according to claim 18, wherein a longitudinal end surface of the guide belt is formed at least partially in accordance with the external peripheral surface of a rolling element not taken up in a recess of the guide belt.

32. The chain of rolling elements according to claim 18, wherein the longitudinal thickness of the spacers in their lateral edge portions is smaller than 20% of the radius r of the rolling elements.

33. The chain of rolling elements according to claim 20, wherein the length of each free length section is at least ten times the longitudinal thickness of the spacers.

34. A rolling element chain arrangement, comprising at least one chain of rolling elements with a plurality of rolling elements and an elongate supporting and/or guiding belt having
- a plurality of recesses for the take-up of the rolling elements,
- a plurality of retainers and/or spacers for the rolling elements taken up in the recesses, and
- at least one elongate flexible element for connecting the retainers and/or spacers, wherein, between a leading longitudinal end of a chain of rolling elements and a trailing end of a chain of rolling elements, a separating rolling element is arranged which keeps these two longitudinal ends at a distance.

35. The rolling element chain arrangement according to claim 34, wherein the leading longitudinal end and the trailing longitudinal end are longitudinal ends of the supporting and/or guiding belt of one and the same chain of rolling elements.

36. The rolling element chain arrangement according to claim 34, wherein the leading longitudinal end belongs to a first chain of rolling elements and the trailing longitudinal end belongs to a second chain of rolling elements.

37. The rolling element chain arrangement according to claim 34, wherein a end surface of at least one of the longitudinal ends is formed at least partially in accordance with the external peripheral surface of the separating rolling element.

* * * * *